United States Patent [19]
Garcera et al.

[11] Patent Number: 5,916,440
[45] Date of Patent: Jun. 29, 1999

[54] RIGID MEMBRANE FLUID TREATMENT MODULE

[75] Inventors: Daniel Garcera, Tarbes; Max Laborde, Benac; Jacques Gillot, Odos, all of France

[73] Assignee: Societe des Ceramiques Techniques, Bazet, France

[21] Appl. No.: 08/902,350

[22] Filed: Jul. 29, 1997

[30] Foreign Application Priority Data

Aug. 1, 1996 [FR] France ................................ 96 09749

[51] Int. Cl.$^6$ ............................................ B01D 35/00
[52] U.S. Cl. .................... 210/232; 210/441; 210/445; 210/502.1; 210/510.1; 55/490; 55/502
[58] Field of Search ........................ 210/232, 323.2, 210/321.89, 321.8, 504, 441, 445, 510.1, 502.1; 55/490, 502

[56] References Cited

U.S. PATENT DOCUMENTS

| 4,191,648 | 3/1980 | Kaplan et al. ........................ 210/323.2 |
| 4,265,763 | 5/1981 | Bollinger et al. ................... 210/321.89 |
| 4,461,707 | 7/1984 | Thayer et al. ......................... 210/323.2 |
| 4,502,955 | 3/1985 | Schaupp .................................... 210/232 |
| 4,849,104 | 7/1989 | Garcera et al. ....................... 210/323.2 |
| 5,062,910 | 11/1991 | Garcera et al. ............................ 156/82 |

FOREIGN PATENT DOCUMENTS

| 0 270 051 B1 | 9/1991 | European Pat. Off. . |
| 0 385 089 B1 | 5/1995 | European Pat. Off. . |

*Primary Examiner*—John Kim
*Attorney, Agent, or Firm*—Cantor Colburn LLP

[57] ABSTRACT

A fluid treatment module, particularly for treating ultra-pure fluids by separation or catalytic treatment having at least one treatment membrane in a porous sintered material comprises a rigid tube casing, a rigid compression plate at one or each end thereof having a coating compatible with the fluid(s) to be treated and at least one compensating plate able to slide on the coating, the dimensions and thickness of the compensating plate being set to ensure the module remains sealed over a complete temperature range at which the module is designed to operate.

34 Claims, 5 Drawing Sheets

RIGID MEMBRANE FLUID TREATMENT MODULE

BACKGROUND OF THE INVENTION

The present invention relates to a fluid treatment module, notably for ultra-pure fluids, using separation or catalytic transformation, the module having at least one treatment element of the rigid membrane type. The invention also relates to treatment processes using this module. The separation can for example be a liquid filtration using, for instance, microfiltration, ultrafiltration, nanofiltration, or reverse osmosis or, yet again, gas filtration through one or more membranes. The catalytic transformation can be, for example, reaction of the fluid with a catalyst located on or in a membrane, or, yet again, the reaction of the fluid circulating at one side of a membrane with a second fluid originating from the other side of this membrane and through which this second fluid passes, the function of the membrane then being to regulate the flow of the second fluid.

A membrane is a separating element which generally comprises three parts:

- a rigid support having crude porosity and being highly permeable, imparting shape and rigidity to the element. It generally consists of a porous sintered material which can be a ceramic or a metal, or yet again, carbon;
- a very thin active layer deposited on the support surface, providing the separating function. This active layer, which is porous in the case of a filtration, covers the inner surface, or channels, of the separator element, or, in some case, the outer surface when tubes are used. It can be deposited on the support, or on one or several sub-layers themselves deposited on the support;
- a "sealant" filling the porosity at each end of the support, so as to prevent communication between the upstream and downstream regions of the module, via the crude porosity of the support, where the active membrane does not cover the whole surface of the end of the support. Membranes of the multi-channel type are for example described in the publication "New ceramic filter media for crossflow microfiltration and ultrafiltration, J. Gillot, G. Brinkman, D. Garcera, Fourth World Filtration Congress, Apr. 22–24, 1986, Ostend, Belgium.

Here, the term "module" means an assembly comprising:

- one or several separation or catalytic transformation rigid membranes generally of an elongated shape, usually tubular or prismatic;
- a casing designed to hold the fluid to be treated and which the membrane or membranes separate(s) into several cavities one of which at least contains the fluid to be treated, one of which at least containing the treated fluid.

The casing comprises, as is notably shown in FIG. 1 of European Patent EP-0,270,051:

- a tube housing the axis of which is parallel to the axis of the tubular or multitubular membranes and which includes lateral orifices for entry of the fluid to be treated or evacuation of treated fluid;
- two end plates perpendicular to the cylinder axis and which close off the two ends thereof. These plates carry at least one, and, generally, several orifices, each receiving a seal or gasket for a membrane, the fluid to be treated, or treated fluid, flowing through these orifices;
- mounting seals or gaskets located between the membranes and the wall of the orifices of the end plates, these seals ensuring the membranes are held in place and providing inter-cavity sealing inside the tube housing of the casing.

Such modules, which are known, can comprise metal or ceramic membranes mounted inside a metallic casing, typically of stainless steel, along with at least seals made of elastomer material (for example EPDM, silicone, fluoroelastomer) as for example disclosed in EP-0,270,051 or EP-0,385,089.

In the case of ceramic membrane modules, the casing is typically a stainless steel cylinder inside which between one and hundred tubular or multi-tubular membranes, about one meter long, are mounted between elastomer seals.

However, such modules are not suitable for treating certain highly pure-fluids such as for example ultra-pure water. Indeed, their stainless steel casing releases metal ions which decrease the purity of the treated fluid, notably in the case of ultra-pure water, which can be particularly harmful when this water is employed in the electronic component manufacturing field, or in the pharmaceutical field. Similarly, it is not possible to treat corrosive fluids, and notably fluids containing chlorine ions, using the modules as described above.

However, materials referred to herein as "compatible materials" do exist which are inert vis-a-vis the fluids with which they may come into contact, for example in a module, to the extend that, firstly, there is no risk of them being corroded by the fluid or fluids, and secondly, they will not contaminate the latter. As is known, such materials can be more or less suited to one given fluid, and a suitable one should be chosen as a function of the fluid or fluids concerned. However, it cannot be envisaged to provide modules implementing such materials by simply substituting one compatible material by a material used up until now in known modules, because of the differences in behavior between materials.

Indeed, materials which are compatible, in the sense succinctly given above, with ultra-pure fluids, such as certain polymers and, for example, poly (vinylidene fluoride) (PVDF) have a coefficient of expansion which is much higher than that of ceramics or materials employed for constituting rigid membranes. Conventional assemblies using elastomer seals do not make it possible to compensate this difference in expansion when temperature variations to which the module is subject exceed some ten degrees, which is too small for numerous applications to allow the module to be used in practice.

Moreover, prior art stainless steel modules do not either make it possible to treat certain corrosive fluids such as, for example, liquids containing chlorine ions, which corrode stainless steel. It is then necessary to use casings in special materials such as titanium alloys, which are very expensive.

In order to nevertheless construct a module along conventional lines, and which does not discharge metal ions or which can treat a large variety of corrosive liquids, one can envisage coating all the inner surfaces of a conventionally designed module having a stainless steel casing, with a suitable polymer such as PVDF. However, with this solution, the orifices of the end plate have sharp edges which are difficult to coat uniformly. Moreover, in order to fulfil their function of maintaining the membranes, the elastomer seals are subject to considerable forces which can cause the polymer coating deposited on the orifice wall to slide, or the coating to be damaged. Finally, such a casing consisting of polymer-coated steel would be more expensive due to the complexity of the operation of depositing a coating on surfaces of complex shape.

SUMMARY OF THE INVENTION

The present invention thus provides a module for fluid treatment by separation or catalytic treatment, including at least one rigid treatment membrane housed inside a housing fitted with means cooperating with ends of the membrane or membranes to retain them in position, said module comprising:

a casing of a rigid material compatible with the fluid to be treated, a compensating plate at at least one end of said casing, said compensating plate being dimensioned so as to slide longitudinally in the end of said casing adapted to receive it, and carrying one or several orifices each adapted to receive one end of a membrane via an assembly seal comptible with a fluid to be treated, said compensating plate being made of a material which is compatible with a fluid to be treated, and having a coefficient of expansion identical or very close to a coefficient of expansion of said casing, a compression plate at one or each end of said casing and associated with each compensating plate and being applied against said compensating plate while maintaining the possibility of sliding sideways, the or each compression plate being highly rigid and consisting of a material of great mechanical strength coated with a material compatible with a fluid to be treated at least in the regions where said fluid may circulate, said orifices facing one or more orifices in said compensating plate against which said compression plate is applied, tie rods passing through holes provided at the periphery of the or each compression plate, the or each compression plate exerting pressure on the end or ends of the membrane or membranes via said compensating plate upon which said compression plate bears thereby ensuring said membrane or membranes are held in position inside said casing, under the action of said tie rods when said tie rods are mechanically tensioned.

According to one characteristic, the module can comprise at least one compensating plate the material and dimensions of which are selected as a function of the material and dimensions of the other constituents of said module comprising said casing, said one or more membranes, said tie rods and said compression plate or plates whereby dimensional variations in said compensating plate or plates as a function of temperature, within a range of temperatures to which said compensating plate or plates may be subject, combine with variations in said other components during operation of said module over an admissible temperature range for a fluid or fluids treated, thereby ensuring elasticity of mounting seals is maintained over a complete range of temperatures at which said module is designed to operate, as a function of a fluid or fluids treated.

According to a further characteristic, the treatment module comprises at least one compensating plate the dimensions and thickness of which between compression plate and treatment membrane or membranes is set in order to preserve elasticity of assembly seals over a complete temperature range at which said module is designed to operate, as a function of a fluid or fluids treated.

According to one embodiment, the treatment module comprises at least one compression plate having tie rods bearing thereon via compensating elements of a compensating spacer type the action of which is complementary to the action of said compensating plate or plates, the material and dimensions of said compensating elements being selected as a function of those of other components of said module comprising said casing, said membrane or membranes, assembly seals, said tie rods and said compression and compensating plate or plates.

In a further embodiment, the treatment module comprises at least one compression plate having tie rods bearing thereon via compensating elements of a spring type the action of which is complementary to the action of said compensating plate or plates, a material and dimensions of said compensating elements being selected as a function of those of other components of said module comprising said casing, said membrane or membranes, assembly seals, said tie rods and said compression and compensating plate or plates.

According to yet a further embodiment, the treatment module comprises an outer sheath surrounding said casing and said tie rods thereby bringing the temperature of said tie rods close to the temperature of components of said module that are in contact with a fluid or fluids treated.

According to one embodiment, the treatment module comprises a compensating plate and a compression plate which respectively abut against each other at their respective peripheries beyond said coating of material compatible with a fluid circulating in said fluid orifices provided therein, at least one peripheral seal being inserted between said compensating plate and a region of said compression plate, said region carrying said coating inside a space delimited by said peripheral abutment region for said compensating plate, provided on said compression plate.

In one embodiment, the treatment module includes a compensating plate fixed in a sealed manner to said casing.

In a further embodiment, the treatment module comprises a casing having at least one side opening for a fluid, said opening carrying a side tube which discharges externally of said module, fixed by mechanical assembly including a seal inserted between said conduit and said casing.

In a further embodiment, the treatment module comprises a casing and one or more compensating plates of poly (vinylidene fluoride) (PVDF), and polytetrafluorethylene (PTFE) assembly seals, said compression plate or plates and said tie rods being preferably made of a metal such as steel, a coating provided on said compression plate or plates being of a low-permeability inert material such as fluorinated polymer.

In a further embodiment, the treatment module comprises a casing and one several compensating plates in perfluoralkoxy (PFA) material, assembly seals in polytetrafluoroethylene (PTFE), said compression plate or plates being preferably of a metal such as steel, the coating provided on said compression plates being an inert, low-permeability material such as fluorinated polymer.

In one embodiment, the treatment module comprises a casing and one or more compensating plates of polyvinyl chloride containing excess chlorine (PVC-C), and polytetrafluoroethylene (PTFE) assembly seals, said compression plate or plates and said tie rods being preferably made of a metal such as steel, a coating provided on said compression plate or plates being of a low-permeability inert material preferably of poly(vinylidene fluoride) (PVDF).

In a further embodiment, the treatment module contains a catalyst product placed against, or within, membranes inside the casing.

The invention also provides a treatment process using a module as defined above consisting in filtration of a fluid selected from ultra-pure water, a solution containing chloride ions, a hydrocarbon liquid.

The treatment process using a module as defined above can also consist of a gas filtration and notably, filtration of a corrosive gas.

The treatment process using can also comprise a phase of catalytic transformation of a fluid using a catalyst product placed inside said casing against or within said membrane or membranes.

The treatment process using the above module can also comprise a phase of catalytic reaction of a fluid injected from one side of said membrane or membranes with a fluid injected from another side of said membrane or membranes.

The invention, its features and advantages will now be described in the detailed description which follows with reference to the drawings.

DETAILED DESCRIPTION OF PREFERRED EMBODIMENTS

Figure 1:
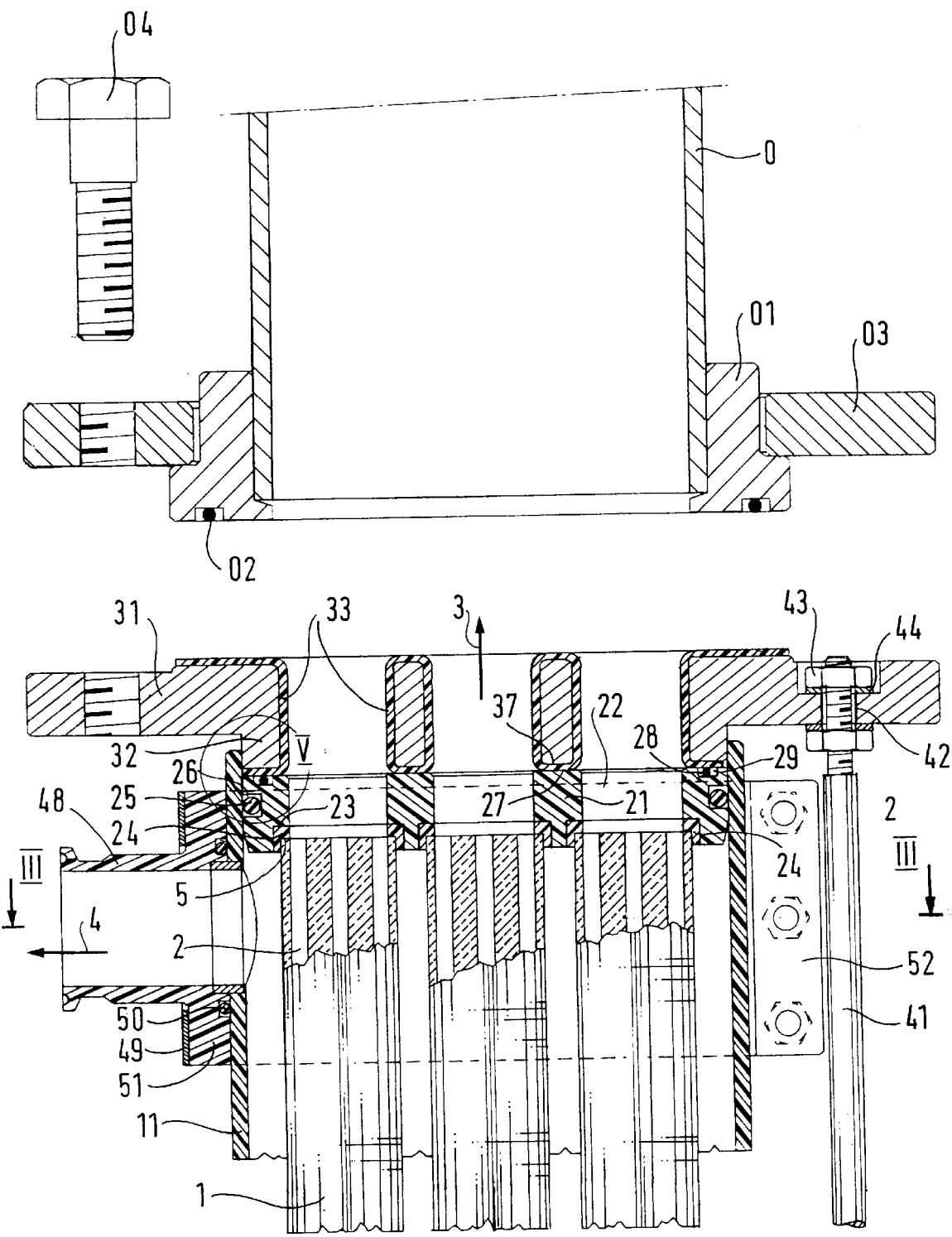
FIG. 1 is a longitudinal partial cross-sectional view of an assembly comprising one end of a treatment module according to the invention and a connecting element designed to provide a linkage between the module and an arrangement providing fluid transit or storage, in an installation.
Figure 2:
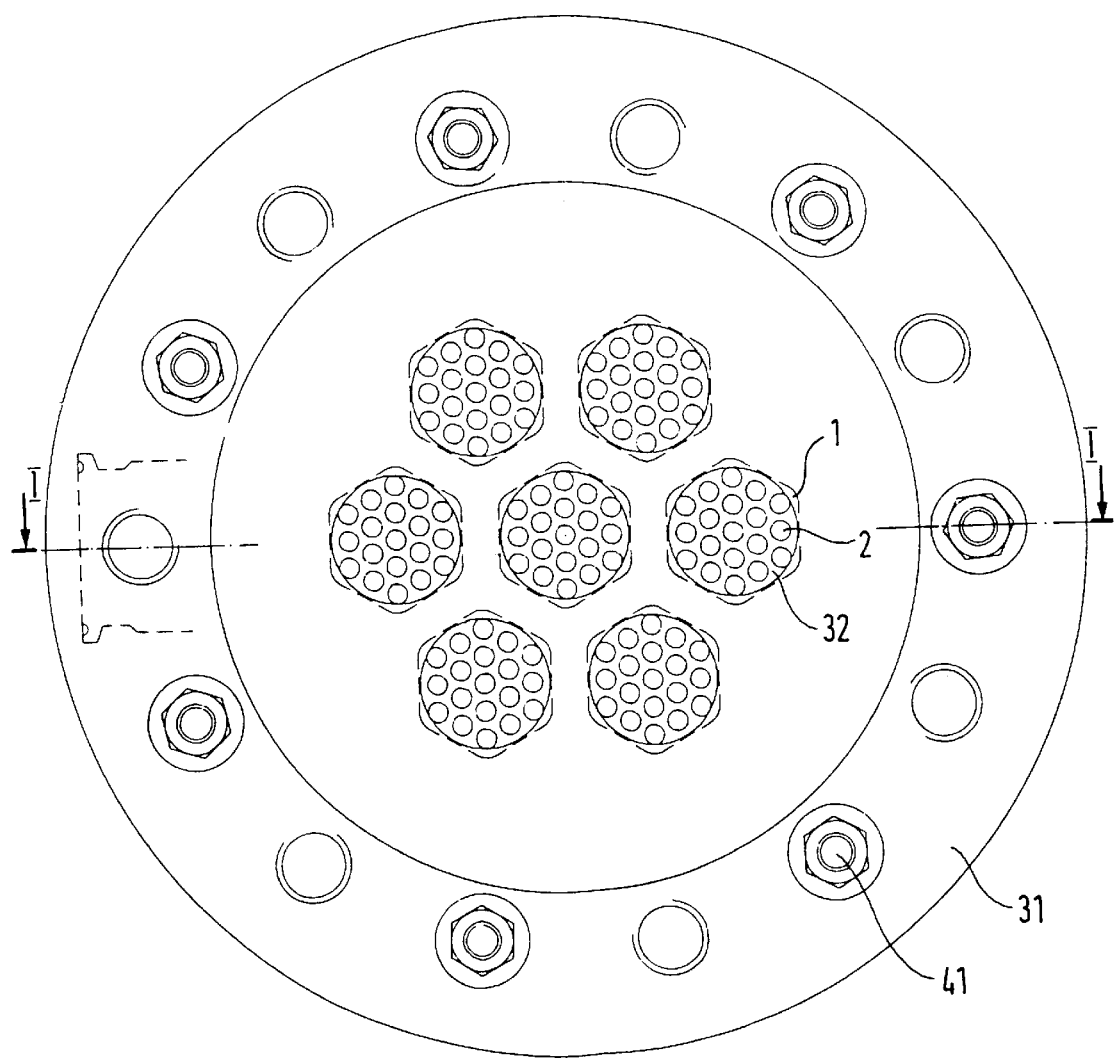
FIG. 2 is an end view of the module.

As indicated above, FIG. 1 shows one of the two ends of a treatment module according to the invention, the module being of elongate shape, and imagined to have been cut at a short distance from this end, together with the mating end of a connector element designed to allow the module to be linked with an arrangement, which is not shown, providing for fluid transit or storage, in an installation.

In one preferred embodiment, the two ends of a module are designed to be symmetrical with respect to a central transverse plane, not shown, of the module.

The connector element is here imagined to comprise a fluid circulation tube 0 the visible end of which is provided with a hollow sealing joining piece 01 fixed on tube 0 and designed to be applied flat against the end of the treatment module to allow fluid circulation between the module and the arrangement serving it, providing fluid transit or storage, which is not shown. A circular seal 02, here imagined to be toroidal, provides sealing of the connection when sealing joining piece 01 is fixed to the module by an assembly comprising a flange 03 and a screw 04.

The treatment module according to the invention as shown, comprises at least one and usually several membranes 1 consisting of a rigid material selected from ceramics, carbon and metals. These membranes are arranged parallel to the module axis.

Each membrane 1 comprises longitudinal channels 2 in which the fluid to be treated, or treated fluid, circulates, the arrows 3 and 4 symbolically showing the fluid circulation in the first case. A casing 11 constitutes the cylindrical side wall of the module, surrounding the membrane(s) 1.

A compensating plate 21 is positioned at least at one of the ends of the module, inside the casing, inside of which it can slide thanks to the provision of suitable dimensions. This plate includes orifices 22 which are situated in line with the channels 2 of the membranes, when the module is assembled.

The orifices 22 each have an inner shoulder 23 allowing them to receive, and to at least partially act as a housing for, a mounting seal 24 which itself is designed to receive one end of one of the membranes 1. These seals 24 maintain the membranes 1 by compressing a flange 5 provided at the end face of the membranes.

A toroidal seal 25 located inside a housing 26 of compensating plate 21 provides sealing between the side face of the latter and the casing 11, this seal still allowing the plate to slide with respect to the tube. A compression plate 31 is positioned at the end of the casing, beyond compensating plate 21, with respect to the membranes situated at this end. This compression plate comprises a core 32 consisting of a material of great mechanical strength and which is highly rigid, covered by a coating 33 consisting of a material which is compatible with the fluid treated. The metal core of this plate is designed to be without any sharp angles, which allows it to receive the coating without any difficulty.

The compensating and compression plates, 21 and 31 respectively, are in sliding abutment one against the other, via their respective faces 27 and 37, a toroidal seal 28 placed inside a housing 29 ensuring sealing between the two plates at the periphery thereof.

Tie rods 41 passing through orifices 42 provided at the periphery of the compression plate ensure compression and thereby the cohesion of the complete module. A portion of the tie rods which participates in compensating thermal expansion of the module assembly is, in the embodiment shown in FIG. 1, that portion comprised between the face of metal washers 44 situated below nuts 43 corresponding to the plane II—II of abutment of the tie rods, and which acts as a stop for the compression plate, and a symmetrical abutment plane, not shown, which will be situated at the other end of the module. This portion of the tie rods, and the length thereof, are respectively referred to below as the "active portion" and the "active length" of the tie rods. Similarly, a compression plate force application plane is defined as the plane through which the plate receives the maintaining force provided by the tie rods, and an active thickness of the compression plate being the distance between its force application plane and the interface between the compression plate and the compensating plate.

In such a module, compression plate 31 also acts as a module connecting flange, it being provided with threaded holes allowing it to receive screws, such as screw 04, for fixing the flange 03 thereby ensuring the joining piece 01 of circulation tube 0 is placed flat against the compression plate.

In a module according to the invention, the compensating plate and compression plate cooperate to provide mechanical and sealing functions essential to correct operation of the module.

From the mechanical aspect, the compensating plate, even though it has orifices for the passage of fluid, should not substantially deform under fluid pressure. A too great deformation due to the effect of the pressure of fluid between the membranes and the casing would have the effect of moving the central areas of the two plates (one at each end) away from each other, and this would destroy the sealed retention of the membranes by compression between the seals 24. Yet, PVDF-type polymers commonly employed as a material compatible with the liquid treated, are relatively flexible, their modulus of elasticity being of the order of 1,500 to 2,000 MPa for PVDF at room temperature. In the module according to the invention, the compensating plate, considering it bears against a compression plate including a thick core in a rigid material which consequently suffers little or no deformation, cannot become deformed to an appreciable extent.

Such a module ensures compensation of thermal expansion of the various components perpendicular to its axis in the following fashion:

as compensating plate 21 and casing 11 are made of the same material or materials having similar coefficients of expansion, their expansions in the transverse direction, in other words perpendicular to the axis of the module, are identical. Toroidal seal 25 thus ensures sealing regardless of temperature;

the compression plate expands less in the transverse direction than the compensating plate. However, this difference in expansion is taken up or absorbed by their sliding one over the other, the sealing provided by seal 28 being maintained.

Regarding longitudinal expansion:

the casing generally expands much more than the membrane; for example, with a casing in PVDF having a coefficient of expansion of $160 \times (10^{-6})$ mm/mm/°C. and an alumina membrane having a coefficient of expansion of $6 \times (10^{-6})$ mm/mm/°C. and a length of 1 mm, the difference in expansion is of the order of 10 mm for a temperature increase of 70° C. This difference in expansion is absorbed by the casing sliding on toroidal seal 25 it is essential that the membranes are kept permanently under longitudinal compression by the seals 24, regardless of temperature variations. If one considers that the reference state is the initial state, at ambient temperature, after assembly of the module, it is necessary that, during a temperature increase, the complete assembly comprising compression plate, compensating plate, membrane mounting seal, membranes comprised between the two tie rod force application planes (on FIG. 1 and its symmetrical plane at the other end of the module, not shown), expand slightly more than the portion of the tie rods comprised between these same planes. This expansion difference E should be less than the additional amount J by which the seals 24 can be compressed elastically, compared to their initial state. In practice, the expansion difference E can be adjusted by a suitable choice of thickness for the compensating plate. In effect, this plate is constituted by a polymer having a much higher coefficient of expansion than that of the sintered materials constituting the membranes, and that of the metal constituting the tie rods. A variation in this thickness thus brings about a significant variation in the expansion difference E. Moreover, the amount J by which seals 24 can be elastically compressed is proportional to their thickness. This thickness can thus be adapted to the expansion difference E that is to be absorbed or taken up.

Several alternative designs can be implemented in order to obtain the best compensation and absorption of longitudinal expansions, and to adapt these to the particular dimensions, materials and operating conditions.

Figure 4:
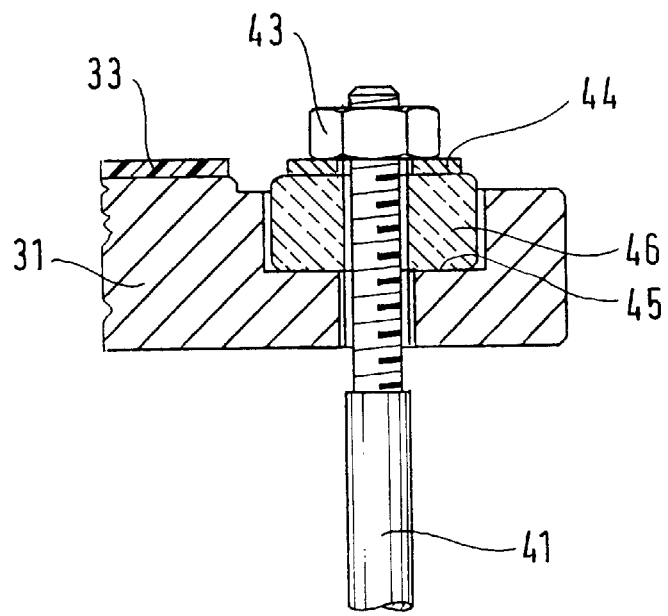
FIG. 4 is a cross-sectional view concerning detail of the design of a tie rod/compression plate sub-assembly of one embodiment of the module according to the invention.

In a first alternative embodiment illustrated in FIG. 4, expansion compensating spacers 46 are inserted between a conventional washer 44 fitted under nut 43, and a top portion 45 of the compression plate. The tie rod force application plane then remains the face of washer 44 directed towards the inside of the module, and the compression plate force application plane if the plane at which the compensating spacer bears on the compression plate. The operating temperature of compensating spacers 46 will be intermediate between that of compression plate 31 which is close to the temperature of the fluid treated, and the temperature of the tie rods 41. These compensating spacers 46 can be rigid; depending on whether their coefficient of expansion is higher or lower than that of the tie rods, they make it possible to increase or decrease the compression of seals 24 should the temperature of the spacers increase. They can also be made of a yielding material. Their elasticity makes it possible in this case to absorb differential longitudinal expansions without significant variation in the compression applied to the seals 24. In one embodiment, the compensating spacers can optionally consist of springs, and particularly "Belleville" type spring washers.

In a second alternative embodiment, the complete module including the tie rods, is surrounded by an outer tubular sheath, not shown, designed to provide thermal insulation for the tie rods with respect to the outside of the module, thereby bringing tie rod temperature to a value closer to that of the inside of the module. This provides an additional possibility of adjusting the expansion difference E.

Figure 5:
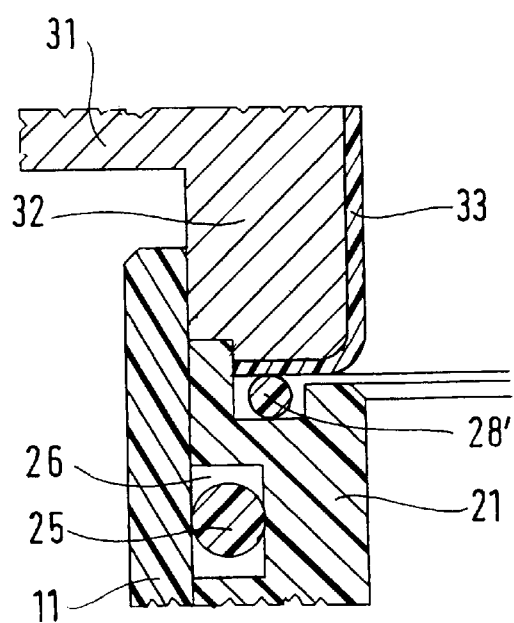
FIG. 5 is a cross-sectional view showing detail of the design of a casing/compression plate/compensating plate assembly of one embodiment of the module according to the invention.

In a third alternative embodiment illustrated in FIG. 5, the coating 33 of compression plate 31 does not cover the complete surface of core 32 by which this plate bears on compensating plate 21. This allows for direct support, in this case imagined as being peripheral, of the compensating plate on the metal of the region of the core of the compression plate at that place where no coating is provided. A seal 28' is inserted between the compensating plate and a region of the compression plate covered with the coating, inside the space the limits of which are constituted by the peripheral support region for the compensating plate, provided on the compression plate.

The advantage of this embodiments is that the coating is compressed less, the latter being in general less hard, and less strong, than the bulk material of the compensating plate, thereby reducing the risk of local deformation of the coating under the effect of this compression.

It is also possible to secure, preferably in a sealed fashion, one of the compensating plates to the casing. This can notably be envisaged if the module only includes one movable compression plate, the other one being optionally replaced by a fixed base integral with the casing.

The lateral fluid entry or entries, or outlet or outlets for casing 11 may show variations of construction. In a first embodiment, not shown, the entries are provided by welding a side tube perpendicular to the casing, using a known technique. In an alternative embodiment shown in FIGS. 1 and 3, a side tube 48 is secured to casing 11 via a mechanical assembly held in place by a collar 49 fixed by a bolt 57, 59 carrying a spring 58, sealing being achieved by means of toroidal seal 50. The collar 49 can be of the same material as the casing; it can also be of metal but should, in this case, be sufficiently yielding to allow the compensating plate and casing to expand without generating stresses that are too high.

Figure 6:
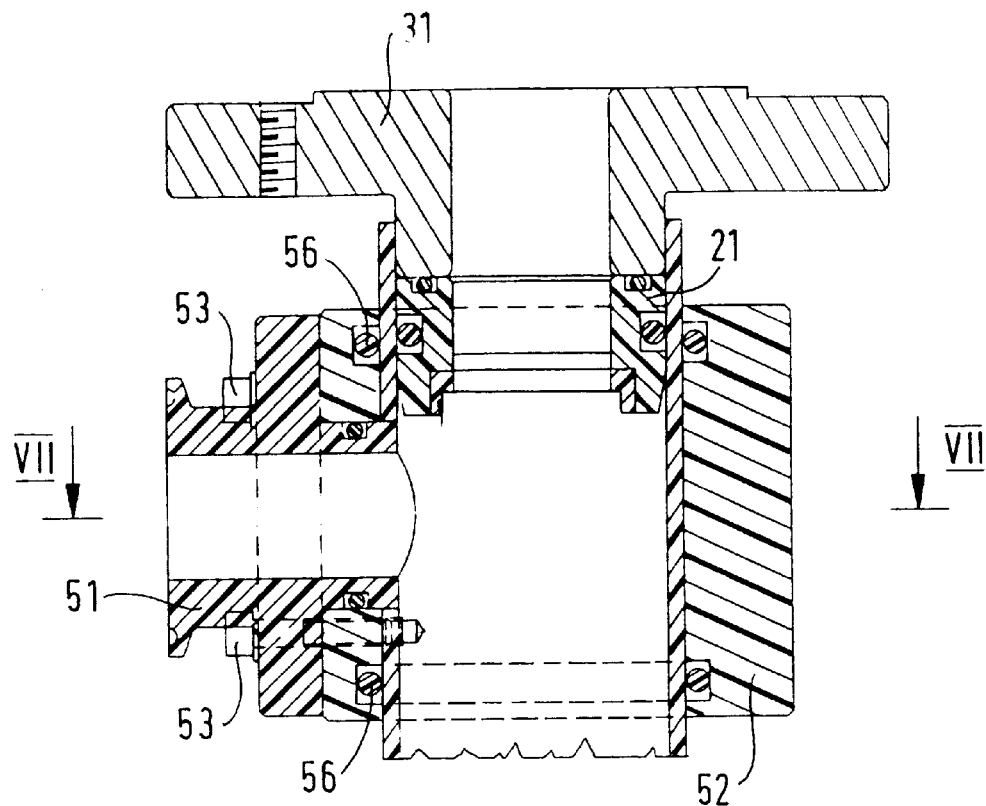
FIG. 6 is a cross-sectional view of a sub-assembly associating a casing and an auxiliary mechanical assembly for a lateral fluid flow conduit of one embodiment of the module according to the invention.
Figure 7:
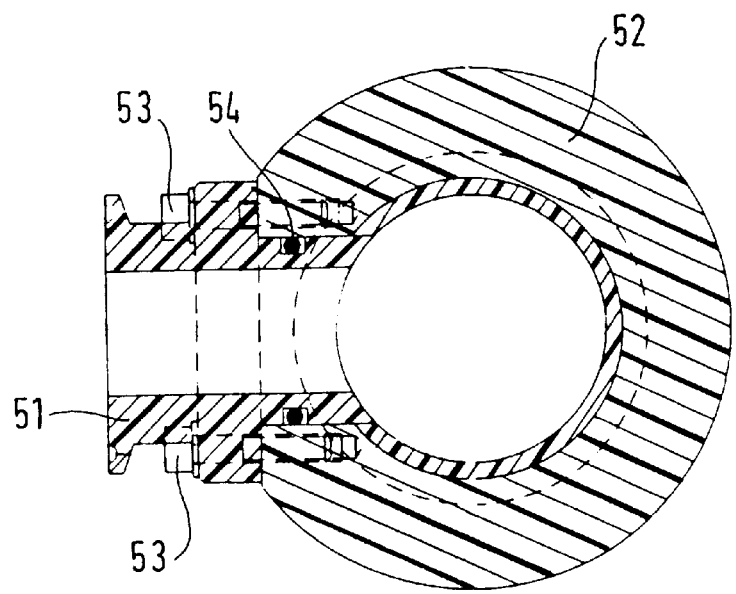
FIG. 7 is a section along line VII—VII of the subassembly shown in FIG. 6.

In another embodiment shown in FIGS. 6, 7, a side tube 51 is fixed to casing 11 via sleeve 52 which is slidably mounted. This sleeve consists of a block of the same polymer as the compensating plate and the casing, and receives one end of side tube 51 which is shaped so as to be able to be secured thereon by screws 53. A seal 54 is located between side tube 51 and sleeve 52 to provide sealing, the seals 56 providing sealing between the casing and sleeve.

The description that follows provides a series of examples of implementation of modules according to the invention.

EXAMPLE 1

Figure 3:
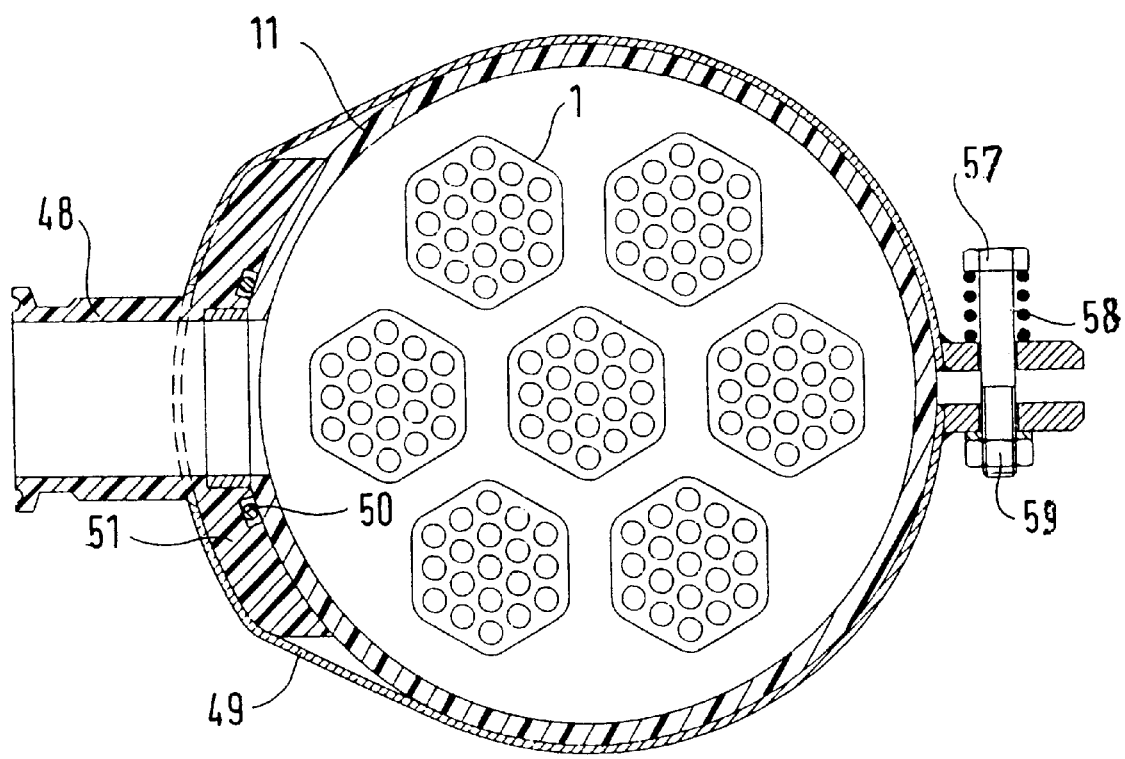
FIG. 3 is a cross-section along line III—III of a subassembly associating a casing and an auxiliary mechanical assembly for a lateral fluid flow conduit, in one alternative embodiment of the module according to the invention.

A module having seven filter elements according to the invention comprises the following elements, as shown in FIGS. 1 and 3:

- seven membranes composed of a porous alumina support with nineteen 4 mm diameter channels in which the liquid to be filtered circulates, the surface of each channel being coated with a layer of zirconia of pore diameter 0.1 micrometer and thickness 12 micrometer. The membranes were 1000 mm long. Alumina has a coefficient of expansion of $6 . 10^{-6}/°C$.;
- at each end of the module, membrane mounting seals are inserted into housings in a PVDF compensating plate having a coefficient of expansion of $160 . 10^{-6}/°C$., the thickness of the base of the housings being 8 mm and its outer diameter 121.8 mm. The seals, which are 5 mm thick between the end of the membrane and the bottom of their housing are of PTFE (polytetrafluoroethylene) of coefficient of expansion $120 . 10^{-6}/°C$. The compensating plate has at its periphery a groove housing a perfluorinated elastomer O-ring seal identified by the Viton® trademark providing sealing with a casing of inner diameter 122 mm, 4 mm thickness and length 1041 mm, also of PVDF;
- the compensating plate is pressed against the membrane end seals by a compression plate consisting of a 316 L stainless steel core having an expansion coefficient of $17.6 . 10^{-6}/°C$. and an active thickness of 30 mm, carrying a layer of ETFE (ethylene/tetrafluoroethylene copolymer) having a coefficient of expansion of $94 . 10^{-6}/°C$., and 0.6 mm thickness. The O-ring seals between the compression plate and compensating plate were in perfluorinated elastomer;
- seven 316L stainless steel tie rods of diameter 10 mm provided retention, compression and cohesion of the complete module.

This module was assembled so that, at room temperature (20° C.) the membrane end seals were compressed by about 0.1 mm. The filter was then used to provide final filtration, at 90° C., of ultra-pure water of resistivity 18 Megohm-cm. The internal components of the module, in other words the membranes, their seals, the compensating plate and the compression plate adopted the temperature of the liquid filtered. The tie rods, which are not in contact with the water to be filtered, stayed at a temperature of 35° C., close to room temperature.

The difference between the sum of the longitudinal expansions of the inner parts of the module and that of the active portion of the tie rods was 0.48 mm. This difference in expansion was taken up or absorbed by the PTFE seals, each one of which was compressed by an additional 0.24 mm compared to their initial state of compression at room temperature. The casing adopted the temperature of the liquid filtered and thus increased in length by about 12 mm, sliding on the toroidal seal surrounding each of the compensating plates, whereas the membranes only increased in length by 0.4 mm.

The diameter of the compensating plates increased by 1.4 mm and that of the portion of the compression plates located facing the compensating plates increased by 0.14 mm. This difference in expansion was taken up by the compression plates sliding over the compensating plates.

EXAMPLE 2

Ultra-pure water was filtered under the same conditions as in example 1, but using a module comprising:

- nineteen membranes identical to those in example 1, but 800 mm long;
- PTFE membrane end seals, 3 mm thick between the end of the membrane and the bottom of their housing;
- PVDF compensating plates having a thickness, at the base of the seal housings, of 20 mm, and a diameter of 207.8 mm;
- a PVDF casing of inside diameter 208 mm and length 864 mm;
- 316L stainless steel compression plates having an active thickness of 36 mm, coated with 0.6 mm thick ETFE;
- twelve 316L stainless steel tie rods 10 mm in diameter;
- EPDM-type elastomer toroidal seals.

Moreover, the complete module, including the tie rods, was surrounded by an insulating sleeve which kept the tie rod temperature at 50° C.

The difference in expansion between the inside of the module and the tie rods was 0.44 mm. This difference was taken up by the PTFE seals, each of which was compressed by 0.22 mm.

The casing increased in length by 10 mm, sliding on the toroidal seals at the periphery of the compensating plates, whereas the membranes only increased in length by 0.34 mm.

The diameter of the compensating plates increased by 2.3 mm and that of the portion of the compression plates situated facing the compensating plates increased by 0.26 mm. This difference in expansion was taken up by the compression plate sliding on the compensating plate.

EXAMPLE 3

Ultra-pure water was filtered under the same conditions as in example 1, but using a module comprising:

- a membrane identical to those in example 1;
- PTFE membrane end seals, of thickness 4 mm between the end of the membrane and the bottom of their housing;
- compensating plates of perfluoroalkcxy (PFA) type polymer having a coefficient of expansion $140 . 10^{-6}/°C$. The thickness of these plates at the bottom of the seal housing was 10 mm, and their diameter was 53.8 mm;
- a casing, also of PFA, of outer diameter 54 mm, thickness 3 mm, and length 1040 mm;
- 316L stainless steel compression plates the active thickness of which was 24 mm, coated with 0.4 mm thick ETFE;
- perfluorinated elastomer toroidal seals (O-rings);
- four 316L stainless steel tie rods of 8 mm diameter.

This module was assembled so that, at room temperature (20° C.) the membrane end seals were compressed by about 0.1 mm. It were then employed for final filtering, at 90° C., of ultra-pure water of resistivity 18 Megohm-cm. The inner components of the module, in other words the membranes, their seals, compensating plate and compression plate, adopted the temperature of the liquid filtered. The tie rods, which were not in contact with the water to be filtered, remained at a temperature of 35° C., close to room temperature. The difference between the sum of the longitudinal expansions of the inner portions of the module and that of the active portion of the tie rods was 0.46 mm. This difference in expansion was taken up by the PTFE seals, each of which was compressed by an additional 0.23 mm. The casing adopted the temperature of the liquid filtered and increased in length by about 10 mm, sliding on the toroidal seal surrounding each one of the compensating plates, whereas the membranes only increased in length by 0.4 mm. The diameter of the compensating plates increased by 0.53 mm and that of the portion of the compression plates facing the compensating plates increased by 0.07 mm. This difference in expansion was taken up by the compression plate sliding on the compensating plate.

EXAMPLE 4

A mixture of organic solvents at 70° C. was filtered using a module comprising:

three tubular membranes in porous carbon having an inside diameter of 20 mm, a thickness of 3 mm, with an inner surface carrying a 25 micrometer thick porous carbon layer with a pore diameter of 0.8 micrometer. These membranes were 500 mm long, the carbon having a coefficient of expansion of $3. 10^{-6}/°C$.;

PTFE membrane end seals, 5 mm thick between the end of the membrane and the bottom of their housing;

PVDF compensating plates having a thickness, at the bottom of the seal housings, of 15 mm and a diameter of 126.8 mm;

a PVDF casing of inside diameter 127 mm, a thickness of 4 mm and length 552 mm;

316L stainless steel compression plates having an active thickness of 24 mm, coated with 0.8 mm thick PVDF;

perfluorinated elastomer toroidal seals (O-rings);

eight 316L stainless steel tie rods of 8 mm diameter.

The difference in expansion between the inside of the module and the tie rods was 0.38 mm. This difference was taken up by the PTFE seals, each being compressed by 0.19 mm.

The casing increased in length by 4.4 mm by sliding on the toroidal seals at the periphery of the compensating plates, whereas the membranes only increased in length by 0.07 mm.

The diameter of the compensating plates increased by 1.0 mm, and that of the portion of the compression plates facing the compensating plates increased by 0.1 mm. This difference in expansion was taken up by the compression plates sliding on the compensating plate.

EXAMPLE 5

An NaCl solution of 3% mass concentration at 50° C. was filtered using a module comprising:

three filter elements composed of a porous alumina support having 19 channels of diameter 6 mm in which the liquid to be filtered circulated, the surface of each channel being coated with a porous alumina layer of pore diameter 0.2 micrometer and thickness 20 micrometer. Each membrane was 1000 mm long;

PTFE membrane end seals, of 6 mm thickness between the end of the membrane and the bottom of their housing;

PVC-C (polyvinyl chloride with excess chlorine) compensating plates having a thickness at the bottom of the seal housings of 15 mm, and a diameter of 126.8 mm. The PVC-C has a coefficient of expansion of $70. 10^{-6}/°C$.;

a PVC-C casing of inner diameter of 127 mm, 4 mm thickness and length 1054 mm;

316Ti stainless steel compression plates having an active thickness of 24 mm, coated with 0.7 mm thick PVDF. 316Ti steel has a coefficient of expansion of $16.5. 10^{-6}/°C$.;

silicone elastomer toroidal seals;

eight 316L stainless steel tie rods of 10 mm diameter.

The difference in expansion between the inside of the module and the tie rods was 0.32 mm. This difference was taken up by the PTFE seals, each of which was compressed by 0.16 mm.

The casing increased in length by 2.2 mm, when sliding on the toroidal seals at the periphery of the compensating plates, whereas the membranes only increased in length by 0.2 mm.

The diameter of the compensating plates increased by 0.27 mm, and that of the portion of the compression plates facing the compensating plates increased by 0.06 mm. The difference in expansion was taken up by the compression plate sliding on the compensating plate.

EXAMPLE 6

A gaseous mixture of argon and HCl at 20° C. was filtered with the module comprising:

a membrane composed of a porous alumina support having nineteen 4 mm diameter channels, the surface of each channel being coated with a 0.1 micron pore diameter layer of porous alumina 5 microns thick. This membrane was 1000 mm long. Filtration took place from the outside of the membrane towards the inside, the gas filtered being evacuated through each of the nineteen channels;

PTFE membrane end seals of thickness 4 mm between the end of the membrane and the bottom of its housing;

PVDF compensating plates having a thickness at the bottom of the seal housings of 10 mm, and a diameter of 51.8 mm;

a PVDF casing of inside diameter 52 mm, of thickness 4 mm and length 1040 mm;

316L stainless steel compression plates of active thickness 24 mm, coated with 0.8 mm thick ETFE;

perfluorinated elastomer toroidal seals;

four 316L stainless steel tie rods of 8 mm diameter.

As the module was used at 20° C, which was also the temperature at which it was assembled, no differential expansion occurred compared to the dimensions as assembled.

Modules according to the invention can be used in numerous separations such as liquid filtration (microfiltration, ultrafiltration, nanofiltration), reverse osmosis or, yet again, gas filtration. They are particularly suitable for filtering ultra-pure fluids, in particular ultra-pure water in the pharmaceutical and microelectronic industries and, in general terms, where known modules in stainless steel are not suitable either because they corrode (for example, filtration of solutions or gases containing chlorides), or because they release too many metal ions.

The modules according to the invention can also be employed as a membrane reactor either for carrying out catalytic transformation (for example for causing a fluid to react with a catalyst on or inside the membrane), or for causing a fluid, circulating on one side of the membrane, to react with another fluid originating from the other side of the membrane, and which passes through the membrane, the function of the membrane being to regulate the flow of the second fluid.

What is claimed is:

1. A module for fluid treatment by separation or catalytic treatment, including at least one rigid treatment membrane housed inside a housing fitted with means cooperating with ends of the membrane or membranes to retain them in position, said module comprising:

a casing of a rigid material compatible with the fluid to be treated, a compensating plate at at least one end of said casing, said compensating plate being dimensioned so as to slide longitudinally in the end of said casing adapted to receive it, and carrying one or several compensating plate orifices each adapted to receive one end of a membrane via an assembly seal compatible with a fluid to be treated, said compensating plate being made of a material which is compatible with a fluid to be treated, and having a coefficient of expansion identical or very close to a coefficient of expansion of said casing, a compression plate at one or each end of said casing and associated with each compensating plate and being applied against said compensating plate while maintaining the possibility of sliding sideways, the or each compression plate being made of a rigid material substantially preventing deformation thereof, carrying one or several compression plate orifices and coated with a material compatible with a fluid to be treated at least in the regions where said fluid may circulate, said compression plate orifices facing one or more compensating plate orifices in said compensating plate against which said compression plate is applied, and tie rods passing through holes provided at the periphery of the or each compression plate, the or each compression plate exerting pressure on the end or ends of the membrane or membranes via said compensating plate upon which said compression plate bears thereby ensuring said membrane or membranes are held in position inside said casing, under the action of said tie rods when said tie rods are mechanically tensioned.

2. The treatment module according to claim 1, comprising at least one compensating plate the material and dimensions of which are selected as a function of the material and dimensions of the other constituents of said module comprising said casing, said one or more membranes, said tie rods and said compression plate or plates whereby dimensional variations in said compensating plate or plates as a function of temperature, within a range of temperatures to which said compensating plate or plates may be subject, combine with variations in said other components during operation of said module over an admissible temperature range for a fluid or fluids treated, thereby ensuring elasticity of mounting seals is maintained over a complete range of temperature at which said module is designed to operate, as a function of a fluid or fluids treated.

3. The treatment module according to claim 2, wherein it comprises at least one compensating plate the dimensions and thickness of which between compression plate and treatment membrane or membranes are set in order to preserve elasticity of assembly seals over a complete temperature range at which said module is designed to operate, as a function of a fluid or fluids treated.

4. The treatment module according to claim 3, wherein it comprises a compensating plate and a compression plate which respectively abut against each other at their respective peripheries beyond said coating of material compatible with a fluid circulating in said compensating plate and compression plate orifices and forming a peripheral abutment region, at least one peripheral seal being inserted between said compensating plate and a region of said compression plate, said region carrying said coating inside a space delimited by said peripheral abutment region for said compensating plate, provided on said compression plate.

5. The treatment module according to claim 3, wherein it comprises a casing and one or more compensating plates of poly(vinylidene fluoride) (PVDF), and polytetrafluoroethylene (PTFE) assembly seals, said compression plate or plates and said tie rods being of steel, a coating provided on said compression plate or plates being of ethylene and tetrafluoroethylene copolymer (ETFE).

6. The treatment module according to claim 3, wherein it comprises a casing and one or several compensating plates in perfluoralkoxy (PFA) material, assembly seals in polytetrafluoroethylene (PTFE), said compression plate or plates being of steel, the coating provided on said compression plates being ethylene and tetrafluoroethylene copolymer (ETFE).

7. The treatment module according to claim 3, wherein it comprises a casing and one or more compensating plates of polyvinylchloride containing excess chlorine (PVC-C), and polytetrafluoroethylene (PTFE) assembly seals, said compression plate or plates and said tie rods being of steel, a coating provided on said compression plate or plates being of poly(vinylidene fluoride) (PVDF).

8. The treatment module according to claim 2, wherein it comprises at least one compression plate having tie rods bearing thereon via compensating spacers the action of which is complementary to the action of said compensating plate or plates, a material and dimensions of said compensating spacers being selected as a function of those of other components of said module comprising said casing, said membrane or membranes, assembly seals, said tie rods and said compression and compensating plate or plates.

9. The treatment module according to claim 8, wherein it comprises a compensating plate and a compression plate which respectively abut against each other at their respective peripheries beyond said coating of material compatible with a fluid circulating in said compensating plate and compression plate orifices and forming a peripheral abutment region, at least one peripheral seal being inserted between said compensating plate and a region of said compression plate, said region carrying said coating inside a space delimited by said peripheral abutment region for said compensating plate, provided on said compression plate.

10. The treatment module according to claim 8, wherein it comprises a casing and one or more compensating plates of poly(vinylidene fluoride) (PVDF), and polytetrafluoroethylene (PTFE) assembly seals, said compression plate or plates and said tie rods being of steel, a coating provided on said compression plate or plates being of ethylene and tetrafluoroethylene copolymer (ETFE).

11. The treatment module according to claim 8, wherein it comprises a casing and one or several compensating plates in perfluoralkoxy (PFA) material, assembly seals in polytetrafluoroethylene (PTFE), said compression plate or plates being of steel, the coating provided on said compression plates being ethylene and tetrafluoroethylene copolymer (ETFE).

12. The treatment module according to claim 8, wherein it comprises a casing and one or more compensating plates of polyvinylchloride containing excess chlorine (PVC-C), and polytetrafluorethylene (PTFE) assembly seals, said compression plate or plates and said tie rods being of steel, a coating provided on said compression plate or plates being of poly(vinylidene fluoride) (PVDF).

13. The treatment module according to claim 2, wherein it comprises at least one compression plate having tie rods bearing thereon via springs the action of which is complementary to the action of said compensating plate or plates, the material and dimensions of said springs being selected as a function of those of other components of said module comprising said casing, said membrane or membranes, assembly seals, said tie rods and said compression and compensating plate or plates.

14. The treatment module according to claim 13, wherein it comprises a compensating plate and a compression plate which respectively abut against each other at their respective peripheries beyond said coating of material compatible with a fluid circulating in said compensating plate and compression plate orifices and forming a peripheral abutment region, at least one peripheral seal being inserted between said compensating plate and a region of said compression plate, said region carrying said coating inside a space delimited by said peripheral abutment region for said compensating plate, provided on said compression plate.

15. The treatment module according to claim 13, wherein it comprises a casing and one or more compensating plates of poly(vinylidene fluoride) (PVDF), and polytetrafluorethylene (PTFE) assembly seals, said compression plate or plates and said tie rods being of steel, a coating provided on said compression plate or plates being of ethylene and tetrafluoroethylene copolymer (ETFE).

16. The treatment module according to claim 13, wherein it comprises a casing and one or several compensating plates in perfluoralkoxy (PFA) material, assembly seals in polytetrafluoroethylene (PTFE), said compression plate or plates being of steel, the coating provided on said compression plates being ethylene and tetrafluoroethylene copolymer (ETFE).

17. The treatment module according to claim 13, wherein it comprises a casing and one or more compensating plates of polyvinylchloride containing excess chlorine (PVC-C), and polytetrafluorethylene (PTFE) assembly seals, said compression plate or plates and said tie rods being of steel, a coating provided on said compression plate or plates being of poly(vinylidene fluoride) (PVDF).

18. The treatment module according to claim 1, wherein it comprises an outer sheath surrounding said casing and said tie rods thereby bringing a temperature of said tie rods close to a temperature of components of said module that are in contact with a fluid or fluids treated.

19. The treatment module according to claim 1, wherein it carries at least one seal providing sealing between a compensating plate and a compression plate and/or a seal providing sealing between a compensating plate and said casing.

20. The treatment module according to claim 1, wherein it comprises a compensating plate and a compression plate which respectively abut against each other at their respective peripheries beyond said coating of material compatible with a fluid circulating in said compensating plate and compression plate orifices and forming a peripheral abutment region, at least one peripheral seal being inserted between said compensating plate and a region of said compression plate, said region carrying said coating inside a space delimited by said peripheral abutment region for said compensating plate, provided on said compression plate.

21. The treatment module according to claim 1, wherein it includes a compensating plate fixed in a sealed manner to said casing.

22. The treatment module according to claim 1, comprising a casing having at least one side opening for a fluid, said opening carrying a side tube which discharges externally of said module.

23. The treatment module according to claim 22, comprising at least one side tube fixed on said casing by mechanical assembly using a collar, said assembly including a seal inserted between said side tube and said casing.

24. The treatment module according to claim 22, comprising at least one side tube fixed on said casing by assembly by means of a sleeve of the same material as said casing around which said sleeve is fitted, said assembly being rendered liquid-tight by annular seals and in combination with said sleeve, a releasable connector element mechanically fastened to said sleeve at an orifice thereof, said orifice being positioned facing a similar orifice provided in a wall of said casing for passage of a fluid.

25. The treatment module according to claim 1, wherein it comprises a casing and one or more compensating plates of poly(vinylidene fluoride) (PVDF), and polytetrafluorethylene (PTFE) assembly seals, said compression plate or plates and said tie rods being of a metal, a coating provided on said compression plate or plates being of a fluorinated polymer.

26. The treatment module according to claim 13, wherein said compression plate coating is of ethylene and tetrafluoroethylene copolymer (ETFE).

27. The treatment module according to claim 1, wherein it comprises a casing and one or several compensating plates in perfluoralkoxy (PFA) material, assembly seals in polytetrafluoroethylene (PTFE), said compression plate or plates being of a metal, the coating provided on said compression plates being of a fluorinated polymer.

28. The treatment module according to claim 27, wherein said compression plate coating is of ethylene and tetrafluoroethylene copolymer (ETFE).

29. The treatment module according to claim 1, wherein it comprises a casing and one or more compensating plates of polyvinylchloride containing excess chlorine (PVC-C), and polytetrafluoroethylene (PTFE) assembly seals, said compression plate or plates and said tie rods being of a metal, a coating provided on said compression plate or plates being of poly(vinylidene fluoride) (PVDF).

30. The treatment module according to claim 1, wherein it contains a catalyst product placed against, or within, membranes inside said casing.

31. The treatment module according to claim 1 wherein said fluid is selected from a group consisting of ultra-pure water, a solution containing chloride ions, and a hydrocarbon liquid.

32. The treatment module according to claim 1 wherein said fluid comprises a gas.

33. The treatment module according to claim 1 further comprising a catalyst product disposed inside said casing against or within said membrane or membranes.

34. The treatment module according to claim 1 wherein said fluid is injected from one side of said membrane or membranes and reacts with another fluid injected from another side of said membrane or membranes.

* * * * *